(12) United States Patent
A et al.

(10) Patent No.: US 11,323,320 B2
(45) Date of Patent: May 3, 2022

(54) CONCURRENT TRANSACTIONS ON NETCONF DEVICES ACROSS NETWORK SERVICES

(71) Applicant: Juniper Networks, Inc., Sunnyvale, CA (US)

(72) Inventors: Chandrasekhar A, Bangalore (IN); Nirmal Anburose, Bangalore (IN); Jayanthi R, Coimbatore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/116,725

(22) Filed: Aug. 29, 2018

(65) Prior Publication Data
US 2020/0036589 A1    Jan. 30, 2020

Related U.S. Application Data

(60) Provisional application No. 62/711,081, filed on Jul. 27, 2018.

(51) Int. Cl.
*G06F 15/177* (2006.01)
*H04L 41/0816* (2022.01)
(Continued)

(52) U.S. Cl.
CPC ...... *H04L 41/0816* (2013.01); *H04L 41/0213* (2013.01); *H04L 41/085* (2013.01); *H04L 41/12* (2013.01); *H04L 12/4641* (2013.01)

(58) Field of Classification Search
CPC .............. H04L 41/0816; H04L 41/085; H04L 41/0213; H04L 41/12; H04L 12/464
See application file for complete search history.

(56) References Cited

U.S. PATENT DOCUMENTS 6,801,940 B1 * 10/2004 Moran ............... H04L 49/90
709/224
8,248,958 B1    8/2012 Tulasi et al.
(Continued)

FOREIGN PATENT DOCUMENTS

| CN | 105262698 A | 1/2016 |
| EP | 2680490 A1 | 1/2014 |
| EP | 3352428 A1 | 7/2018 |

OTHER PUBLICATIONS

"A Simple Network Management Protocol (SNMP)", RFC 1157, Network Working Group, May 1990, retrieved Jul. 8, 2020. (Year: 1990).*

(Continued)

*Primary Examiner* — Suraj M Joshi
*Assistant Examiner* — Jaren Means
(74) *Attorney, Agent, or Firm* — Shumaker & Sieffert, P.A.

(57) ABSTRACT

Techniques are disclosed for managing a network. In one example, a device configuration manager is configured to generate, in accordance with a device management protocol, a configuration change request representing a transaction having a first sub-transaction specifying a first configuration change for a network device of the network and a second sub-transaction specifying a second configuration change for the same network device. The device configuration manager is further configured to output the configuration change request to the network device and receive a reply message from the network device. The reply message includes a first response element specifying whether the first configuration change is successfully committed at the network device and a second response element specifying whether the second configuration change is successfully committed at the network device.

18 Claims, 8 Drawing Sheets

(51) Int. Cl.
*H04L 41/0213* (2022.01)
*H04L 41/085* (2022.01)
*H04L 41/12* (2022.01)
*H04L 12/46* (2006.01)

(56) References Cited

U.S. PATENT DOCUMENTS

| | | | | |
|---|---|---|---|---|
| 8,335,171 B1* | 12/2012 | Purkayastha | ....... | H04L 41/0213 370/254 |
| 9,094,299 B1* | 7/2015 | Rao D.S. | ............ | H04L 41/0803 |
| 10,623,320 B2 | 4/2020 | Chen et al. | | |
| 2002/0116485 A1* | 8/2002 | Black | ................. | H04L 41/0806 709/227 |
| 2006/0123103 A1 | 6/2006 | Shankar et al. | | |
| 2013/0332504 A1* | 12/2013 | Nishioka | ............. | H04L 41/0846 709/201 |
| 2013/0346574 A1 | 12/2013 | Singaraju et al. | | |
| 2017/0331669 A1* | 11/2017 | Ganesh | ............... | H04L 41/0226 |
| 2018/0234344 A1* | 8/2018 | Chen | .................... | H04L 47/125 |

OTHER PUBLICATIONS

"Introduction to Version 3 of the Internet-standard Network Management Framework", RFC 2570, Network Working Group, Apr. 1999, retrieved Jul. 8, 2020. (Year: 1999).*

"Version 2 of the Protocol Operations for the Simple Network Management Protocol (SNMP)", RFC 3416, Network Working Group, Dec. 2002, retrieved Jul. 8, 2020. (Year: 2002).*

"Requirements for Subscription to YANG Datastores", RFC 7923, Network Working Group, Jun. 2016, retrieved Jul. 8, 2020. (Year: 2016).*

Enns, "Network Configuration Protocol (NETCONF)," Internet Engineering Task Force (IETF), RFC 6241, Jun. 2011, 114pp.

Enns, "NETCONF Configuration Protocol," Network Working Group, RFC 4741, Dec. 2006, 96pp.

Bjorklund, "YANG—A Data Modeling Language for the Network Configuration Protocol (NETCONF)," Internet Engineering Task Force (IETF), RFC 6020, Oct. 2010, 174 pp.

Extended Search Report from counterpart European Application No. 19178993.2, dated Nov. 29, 2019, 7 pp.

Response to Extended Search Report dated Nov. 29, 2019 from counterpart European Application No. 19178993.2, filed Jul. 21, 2020, 15 pp.

Examination Report from counterpart European Application No. 19178993.2, dated Nov. 16, 2020, 4 pp.

Response to EP Communication filed Mar. 16, 2021 in counterpart European Application No. 19178993.2, 12 pp.

Examination Report from counterpart European Application No. 19178993.2, dated Jul. 14, 2021, 4 pp.

First Office Action and Search Report, and translation thereof, from counterpart Chinese Application No. 201910579499.9 dated Dec. 17, 2021, 14 pp.

Response to Examination Report dated Jul. 14, 2021 from counterpart European Application No. 19178993.2, filed Nov. 9, 2021, 3 pp.

* cited by examiner

CONCURRENT TRANSACTIONS ON NETCONF DEVICES ACROSS NETWORK SERVICES

This application claims the benefit of U.S. Provisional Application No. 62/711,081 by A et al., entitled "CONCURRENT TRANSACTIONS ON NETCONF ACROSS NETWORK SERVICES," and filed on Jul. 27, 2018, the entire contents of which is incorporated herein by reference.

TECHNICAL FIELD

This disclosure relates to computer networks and, more particularly, to techniques for configuring and managing network devices.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, various clients, such as human users, automated scripts or network management systems, can perform configuration tasks as well as collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks.

The Network Configuration Protocol (NETCONF) is a standard defined by the Internet Engineering Task Force (IETF) that provides mechanisms to install, manipulate, and delete the configuration of network devices. By interacting with the management interface, clients can use NETCONF to apply configuration changes at network devices on a network.

SUMMARY

In general, this disclosure describes techniques for concurrently updating a network device with multiple configuration transactions in a single configuration change request where each transaction can be separately committed to the database and rolled-back if needed. For example, techniques described herein may permit a network management system to generate and output a configuration change request that includes multiple sub-transactions, each sub-transaction specifying one or more configuration changes to be pushed to a network device. The network device may concurrently commit the configuration changes specified by the multiple sub-transactions and generate a single reply message, where the reply message includes a respective response element for each requested sub-transaction and which indicates whether the configuration change specified by each of the corresponding sub-transactions was successfully committed at the network device. In some examples, techniques for concurrently updating a network device may include dividing a batch of configuration change requests for network devices that do not support sub-transaction identifiers.

For example, this disclosure describes a new form of a Network Configuration Protocol (NETCONF) configuration transaction request that allows multiple sub-transactions of configuration changes to be specified in a single NETCONF message. Moreover, the disclosure describes a new form of a NETCONF configuration reply message by which the managed device is able to indicate whether each of the configuration sub-transactions was successfully committed to the managed device.

Further, the disclosure also describes extensions to a higher-level service model utilized by the network management system. As described, the extension allows the service model to control the use and format of a network configuration change request for specifying concurrent configuration sub-transactions when configuring a managed device, such as when configuring a network service on the managed device.

The techniques may provide certain technical advantages, such as potentially reducing an amount of network resources utilized and/or time required to configure network devices. As one example, the techniques may be particularly advantageous, for example, in network systems in which a hub-and-spoke virtual private network (VPN) is being provisioned, especially in a large network environment where multiple customer VPN sites are being provisioned. For example, the techniques may permit provisioning multiple customer sites on a hub router by issuing a single NETCONF configuration change message that includes multiple sub-transactions, each sub-transaction specifying configuration data to be provisioned on the hub router for a respective customer site being brought online. As described, the techniques allow the sub-transactions to be committed concurrently and for the managed network router to issue a single reply message the indicates which of the sub-transactions succeeded and which failed, if any.

In one example, this disclosure describes a method performed by a network management system (NMS) device that manages a network, the method comprising: generating, by processing circuitry of the NMS device, in accordance with a device management protocol, a configuration change request representing a transaction having a first sub-transaction specifying a first configuration change for a network device of the network and a second sub-transaction specifying a second configuration change for the same network device; outputting, by the processing circuitry, the configuration change request to the network device; and receiving, by the processing circuitry, a reply message from the network device, the reply message including a first response element specifying whether the first configuration change is successfully committed at the network device and a second response element specifying whether the second configuration change is successfully committed at the network device.

In another example, this disclosure describes a networking device including a control unit; a configuration datastore configured to store configuration data; a device configuration manager executing on the control unit of the network device to: generate, in accordance with a device management protocol, a configuration change request representing a transaction having a first sub-transaction specifying a first configuration change for a network device of the network and a second sub-transaction specifying a second configuration change for the same network device; output the configuration change request to the network device; and receive a reply message from the network device, the reply message including a first response element specifying whether the first configuration change is successfully committed at the network device and a second response element specifying whether the second configuration change is successfully committed at the network device.

In another example, this disclosure describes a non-transitory computer-readable medium including instructions that, when executed, cause processing circuitry of a networking device to: generate, in accordance with a device management protocol, a configuration change request representing a transaction having a first sub-transaction specifying a first configuration change for a network device of the network and a second sub-transaction specifying a second configuration change for the same network device; output the configuration change request to the network device, and receive a reply message from the network device, the reply message including a first response element specifying whether the first configuration change is successfully committed at the network device and a second response element specifying whether the second configuration change is successfully committed at the network device.

In another example, this disclosure describes a networking device comprising: means for generating, in accordance with a device management protocol, a configuration change request representing a transaction having a first sub-transaction specifying a first configuration change for a network device of the network and a second sub-transaction specifying a second configuration change for the same network device; means for outputting the configuration change request to the network device; and means for receiving a reply message from the network device, the reply message including a first response element specifying whether the first configuration change is successfully committed at the network device and a second response element specifying whether the second configuration change is successfully committed at the network device.

In one example, this disclosure describes a method performed by a managed device of a network, the method comprising: receiving, by processing circuitry of the managed device, from a network management system, a configuration change request representing a transaction having a plurality of sub-transactions, wherein each sub-transaction of the plurality of sub-transactions specifies one or more respective configuration changes for the managed device; selectively installing, by the processing circuitry, for each sub-transaction of the plurality of sub-transactions, the one or more respective configuration changes at the managed device; constructing, by the processing circuitry, a reply message based on the selectively installing, wherein the reply message comprises, for each sub-transaction of the plurality of sub-transactions, a respective response element indicating whether the managed device committed the one or more respective configuration changes in a running configuration for the managed device; and outputting, by the processing circuitry, to the network management system, the reply message.

In another example, this disclosure describes a networking device including a control unit; a configuration datastore configured to store configuration data; a device configuration manager executing on the control unit of the network device to: receive, from a network management system, a configuration change request representing a transaction having a plurality of sub-transactions, wherein each sub-transaction of the plurality of sub-transactions specifies one or more respective configuration changes for the managed device; selectively install, for each sub-transaction of the plurality of sub-transactions, the one or more respective configuration changes at the managed device; construct a reply message based on the selectively installing, wherein the reply message comprises, for each sub-transaction of the plurality of sub-transactions, a respective response element indicating whether the managed device committed the one or more respective configuration changes in a running configuration for the managed device; and output, to the network management system, the reply message.

In another example, this disclosure describes a non-transitory computer-readable medium including instructions that, when executed, cause processing circuitry of a networking device to: receive, from a network management system, a configuration change request representing a transaction having a plurality of sub-transactions, wherein each sub-transaction of the plurality of sub-transactions specifies one or more respective configuration changes for the managed device; selectively install, for each sub-transaction of the plurality of sub-transactions, the one or more respective configuration changes at the managed device; construct a reply message based on the selectively installing, wherein the reply message comprises, for each sub-transaction of the plurality of sub-transactions, a respective response element indicating whether the managed device committed the one or more respective configuration changes in a running configuration for the managed device; and output, to the network management system, the reply message.

In another example, this disclosure describes a networking device comprising: means for receiving, from a network management system, a configuration change request representing a transaction having a plurality of sub-transactions, wherein each sub-transaction of the plurality of sub-transactions specifies one or more respective configuration changes for the managed device; means for selectively installing, for each sub-transaction of the plurality of sub-transactions, the one or more respective configuration changes at the managed device; means for constructing a reply message based on the selectively installing, wherein the reply message comprises, for each sub-transaction of the plurality of sub-transactions, a respective response element indicating whether the managed device committed the one or more respective configuration changes in a running configuration for the managed device; and means for outputting, to the network management system, the reply message.

The details of one or more examples of the techniques of this disclosure are set forth in the accompanying drawings and the description below. Other features, objects, and advantages will be apparent from the description and drawings, and from the claims.

DETAILED DESCRIPTION

Figure 1:
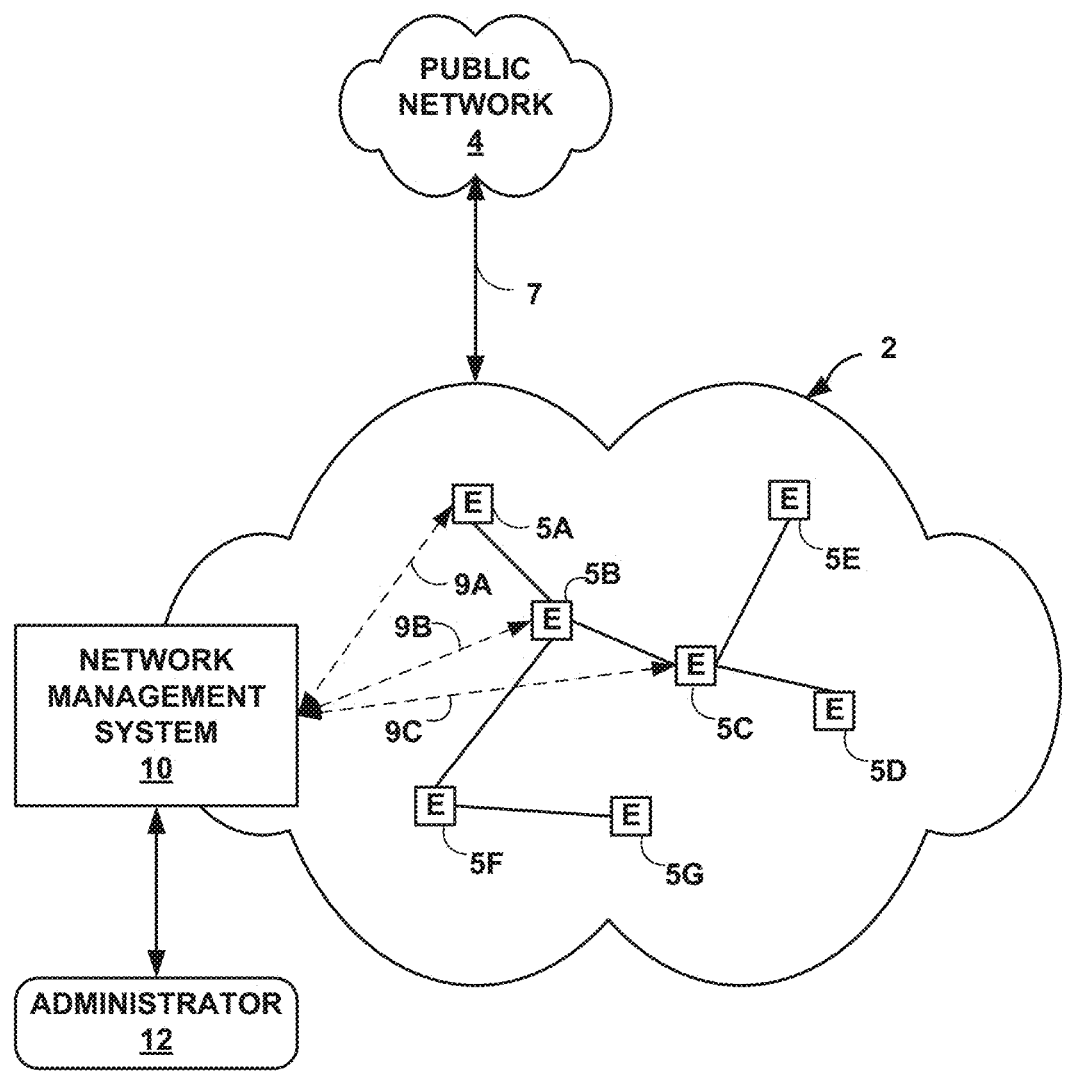
FIG. 1 is a block diagram illustrating elements of an enterprise network that are managed using a network management system in accordance with one or more aspects of this disclosure.

FIG. 1 is a block diagram illustrating elements of an enterprise network 2 that are managed using a network management system 10. Managed elements 5A-5G (collectively, elements 5) of enterprise network 2 are existing network devices interconnected via communication links to form a communication topology in order to exchange resources and information. Elements 5 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 5 may be physical links (e.g., optical, copper, and the like) or wireless.

Enterprise network 2 is shown coupled to public network 4 (e.g., the Internet) via communication link 7. Public network 4 may include, for example, one or more client computing devices. Public network 4 may provide access to web servers, application servers, public databases, media servers, end-user devices, and other types of network resource devices and content. Network devices in public network 4 may present a number of security threats to enterprise network 2. For example, devices in public network 4 may attempt to deliver worms, trojans, and/or viruses to one or more of elements 5. As another example, a hacker using a device in public network 4 may attempt to infiltrate enterprise network 2 to snoop, corrupt, destroy, or steal information stored by one or more of elements 2.

Network management system 10 is communicatively coupled to elements 5 via enterprise network 2. Network management systems 10 may be coupled either directly or indirectly to the various elements 5. Once elements 5 are deployed and activated, administrator 12 may use network management system 10 to manage elements 5 using a management protocol designed for management of configuration data within elements 5, such as the Simple Network Management Protocol (SNMP), or the Network Configuration (NETCONF) protocol, or a derivative thereof, such as the Juniper Device Management Interface, to perform the configuration. Details of the NETCONF protocol may be found at RFC 6241: "NETCONF Configuration Protocol," Network Working Group, the Internet Engineering Task Force draft, June 2011, available at http://tools.ietforg/html/rfc6241, which is incorporated herein by reference in its entirety.

In common practice, network management system 10 and elements 5 managed by network management system 10 are centrally maintained by an IT group of the enterprise and are collectively referred to as an element management system (EMS) or a network management system (NMS). Administrator 12 interacts with network management system 10 to remotely monitor and configure elements 5. For example, administrator 12 may receive alerts from network management system 10 regarding any of elements 5, view configuration data of elements 5, modify the configurations data of elements 5, add new network devices to enterprise network 2, remove existing network devices from enterprise network 2, or otherwise manipulate the enterprise network 2 and network devices therein. Although described with respect to an enterprise network, the techniques of this invention are applicable to other network types, public and private, including LANs, VLANs, VPNs, and the like.

Administrator 12 uses network management system 10 to configure elements 5 to specify certain operational characteristics that further the objectives of administrator 12. For example, administrator 12 may specify for an element 5 a particular operational policy regarding security, device accessibility, traffic engineering, quality of service (QoS), network address translation (NAT), packet filtering, packet forwarding, rate limiting, or other policies. Network management system 10 uses a network management protocol designed for management of configuration data within managed network elements 5, such as the SNMP protocol or the NETCONF protocol or a derivative thereof, such as the Juniper Device Management Interface, to perform the configuration.

In general, NETCONF provides mechanisms for configuring network devices and uses an Extensible Markup Language (XML)-based data encoding for configuration data, which may include policy data. NETCONF is described in R. Enns et al., RFC 4741: "NETCONF Configuration Protocol," Network Working Group, the Internet Engineering Task Force draft, December 2006, available at http://tools.ietf.org/html/rfc4741, which is incorporated herein by reference in its entirety. Network management system 10 may establish NETCONF sessions with one or more of elements 5. In the example of FIG. 1, network management system 10 participates in NETCONF sessions 9A-9C with elements 5A-5C, respectively.

Network management system 10 may "serially push" configuration changes to each one of elements 5. For example, network management system 10 may send a first configuration change request for a first set of configuration changes and upon receiving a reply message indicating whether the first set of configuration changes are committed, send a second configuration change request for a second set of configuration changes. However, serially pushing configuration changes may slow down an activation of elements 5, particularly in application where many elements 5 are activated concurrently (e.g., software-driven wide-area networks) such that a single element (e.g., hub device) has many sets of configuration changes to be applied.

In the example of FIG. 1, network management system 10 extends NETCONF to "concurrently push" configurations changes of one or more of network elements 5 in accordance with various aspects of the techniques described in this disclosure. For example, network management system 10 uses the device management protocol (e.g., NETCONF) to remotely configure elements 5 and, as described herein, uses an extended device management protocol that enables network management system 10 to specify multiple sub-transactions in a single configuration change request, where each sub-transaction include one or more configuration changes to be separately committed on managed network element 5 receiving the request. For instance, network management system 10 may send, to element 5C, a single configuration change request that specifies both a first sub-transaction for a first set of configuration changes and a second sub-transaction for a second set of configuration changes. In this instance, upon or while installing the first set of configuration changes at element 5C, element 5C independently installs, without further interaction with network management system 10, the second set of configuration changes. Moreover, element 5C may install each of the first set and second set of configuration changes as independent "commits" to the underlying configuration database such that each of the first and second configuration changes may be separately rolled-back, if needed. In accordance with the techniques described herein, element 5C generates a single reply message indicating whether the first set of configuration changes and the second set of configuration changes are committed.

In some examples, network management system 10 may operate in accordance with one or more high-level service models that provides a definition for a network service, such as a virtual private network to be deployed across managed elements 5 within network 2. In addition, network management system 10 may operate according to one or more low-level device models that specify the mechanisms to be used to configure each of managed network elements 5, which may constitute network devices of different types (e.g., firewalls, routers, switches, gateways, and the like) from different manufactures, thereby having different interface and configuration requirements. As described herein, in some examples, one or more of the high-level service models is extended, as described herein, to define an additional model object (e.g., a multiplexer object), that is used to control the properties and format of the extended configuration change request used by network management system 10, as controlled by the low-level device model, when interacting with one or more managed elements 5 to install multiple sub-transactions in a single configuration change request. In this way, the techniques provide certain technical advantage in which support and use of the low-level extensions to the device management protocol, e.g., NETCONF, can be easily controlled by and enabled for high-level network services.

Figure 2A:
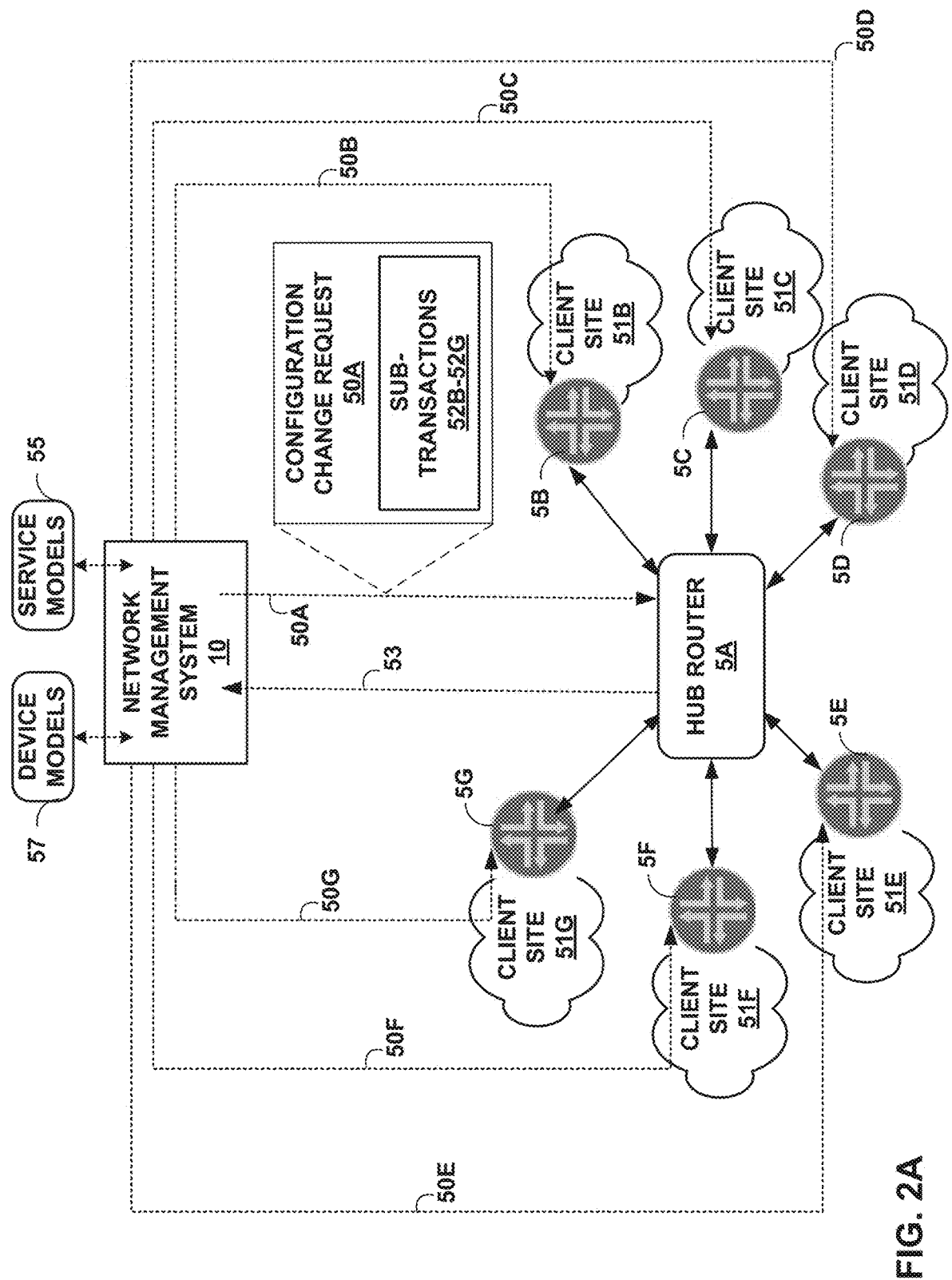
FIG. 2A is a block diagram illustrating an example hub and spoke configuration of elements of a network and an example managed device that concurrently commits multiple sub-transactions in accordance with one or more aspects of this disclosure.

FIG. 2A is a block diagram illustrating one example use case for the techniques described herein. In particular, FIG. 2A illustrates an example of a hub-and-spoke virtual private network (VPN) configuration of network elements 5 (shown in this example as a hub router 5A and spoke routers 5B-5E servicing respective client sites 51B-51G). In networks such as the example shown in FIG. 1, network management system 10 provisions an end-to-end VPN network service across the network by installing respective configuration data within hub router 5A and spoke routers 5B-5G. In general, network management system configures each of spoke routers 5B-5G with respective configuration data necessary to operate as a spoke within the VPN service, and separately configures and validates configuration data for each client site 51 on hub router 5A. In other words, in generally, network management system 10 typically directs hub router 5A to install and validate distinct configuration data for each client site 51 as the client sites are brought online in the VPN service. Without the technical advantages of the techniques described herein, the configuration of hub router in this context can easily become a bottleneck, especially large scale service provider networks, when provisioning network services. As illustrated herein, the techniques enable network management system 10 to specify multiple sub-transactions 52B-52G in a single configuration change request 50A, where each sub-transaction include one or more configuration changes to be separately committed on hub router 5A. Hub router 5A installs, without further interaction with network management system 10, the configuration changes for each sub-transaction as independent "commits" to the underlying configuration database such that the configuration changes for any sub-transaction may be separately validated and rolled-back, if needed. In accordance with the techniques described herein, hub router 5A generates a single reply message 53 indicating whether the configuration changes for each of the sub-transactions 52B-52G have been successfully committed and validated. In this example, network management system 10 may send also configuration change requests 50B-50G to a respective spoke router 5B-5G that form spokes of the exemplary hub and spoke configuration. Each of spoke routers 5B-5G operates to commit the configuration data specified in change requests 50B-50G and outputs replies (not shown) indicating whether the configuration data has been successfully committed. In this case, the configuration change requests 50B-50G issued by network management system 10 to spoke routers 5B-5G may be conventional change requests or may be extended change requests as described herein that specify multiple concurrent sub-transactions.

As described herein, network management system 10 may operate in accordance with one or more high-level service models 55 that each provides a definition for a network service, such as the hub-and-spoke virtual private network to be deployed across routers 5. In addition, network management system 10 may operate according to one or more low-level device models 57 that specify the mechanisms to be used to configure each of routers 5. As one example, network management system 10 may be configured to operate in accordance with service models 55 that conform to a YANG model, which is described in Bjorklund, "YANG-A Data Modeling Language for the Network Configuration Protocol (NETCONF)," Internet Engineering Task Force, RFC 6020, October 2010, available at tools.ietf.org/html/rfc6020), incorporated herein by reference. In the hub and spoke example of FIG. 2A, service models 55 may, for example, conform to the YANG data modeling language and provide the high-level definition of the network services to be deployed, including the VPN service. In response to input from administrator 12, network management system operates in accordance with service models 55 and device models 57 to install the necessary configuration data at hub router 5A and spoke routers 5B-5G to provision the network service and bring online the VPN service for each of the client sites 51. Said differently, for example, spoke routers 5B-5G that would be joining the VPN service are configured with corresponding configuration data so as to communicate through hub router 5A, and hub router 5A is configured to support each of client sites 51, thereby forming the hub-and-spoke VPN service. Though all these configuration changes may each have a respective requirements at the application level (e.g., YANG model), in some systems, the application-level requirements are translated into a respective transaction of configuration changes at the hub (e.g., element 5A) in accordance with device models 57.

As such, to accommodate the hub and spoke configuration, network management system 10 may push separate configuration change requests to accommodate configuration changes at elements 5B-5G, which form spokes of the exemplary hub and spoke configuration. For example, network management system 10 may send a first configuration change request to accommodate configuration changes at element 5B, output a second configuration change request to element 5A to accommodate configuration changes at 5C, and so forth. Moreover, each of spoke routers 5B and corresponding client sites 51B-51G often requires separate provisioning and validation of configuration data on hub router 5A as the client sites are brought online. As described above, serially pushing configuration changes, as may be required with conventional protocols and techniques, to hub router 5A for separate commit and validation may slow down activation of spoke routers 5B-5G and deployment of the overall network service.

In the example of FIG. 2A, network management system 10 extends one or more of service models 55 to translate application level service requirements into a respective sub-transaction of configuration changes at the hub router 5A in accordance with various aspects of the techniques described in this disclosure. In this way, the techniques provide certain technical advantage in which support and use of the low-level extensions to the device management protocol, e.g., NETCONF, can be easily controlled by and enabled for high-level network services. As one example, the YANG model may include an extension defining a multiplexer "ext:multiplexer", an example of which follows.

```
multiplexer: Extension to generate the Multiplexer
id: contains the paths in service model, that would be used to
generate the multiplexer-id.
ext:multiplexer {
      ext:id {
            ext:path:["UUID"]
      }
}
ext:multiplexer {
      ext:id {
            ext:path: ["/sdwan/hub"]
      }
}
```

In some examples, network management system 10 may set the multiplexer identifier ("id") to include a hub name and identifier value. For example, network management system 10 may set the multiplexer identifier ("id") to include a hub name for hub router 5A when spoke routers 5B-5G are solely for a common tenant. In examples, where hub router 5A and spoke routers 5B-5G is configured for a multi-tenant configuration (e.g., Multi-Tenant SD-WAN) so as to service multiple, different VPNs for different customers, element 5A may set the multiplexer identifier ("id") to include a hub name, a tenant identifier ("Tenant-id"), and identifier value, an example of which follows.

```
ext:multiplexer {
      ext:id {
            ext:path: ["/sdwan/tenant-id","/sdwan/hub"]
      }
}
```

In the example of FIG. 2A, network management system 10 extends NETCONF, as one example, to "concurrently push" configurations changes to hub router 5A in accordance with various aspects of the techniques described in this disclosure. For example, network management system 10 may send, to hub router 5A, a single configuration change request 50A that specifies sub-transaction 52B for configuration changes required to support spoke router 5B, sub-transaction 52C for configuration changes required to support spoke router 5C, sub-transaction 52D for configuration changes required to support spoke router 5D, sub-transaction 52E for configuration changes required to support spoke router 5E, and so forth. In this instance, upon installing configuration changes of sub-transaction 5B at hub router 5A, hub router 5A installs, without further interaction with network management system 10, configuration changes of sub-transaction 5C, and so forth until configuration changes of sub-transactions 5B-5G are installed (committed and validated) at element 5A and generates a single reply message indicating which of the sub-transactions of sub-transactions 52B-52G were successfully committed and which, if any, failed and should be rolled back.

Figure 2B:
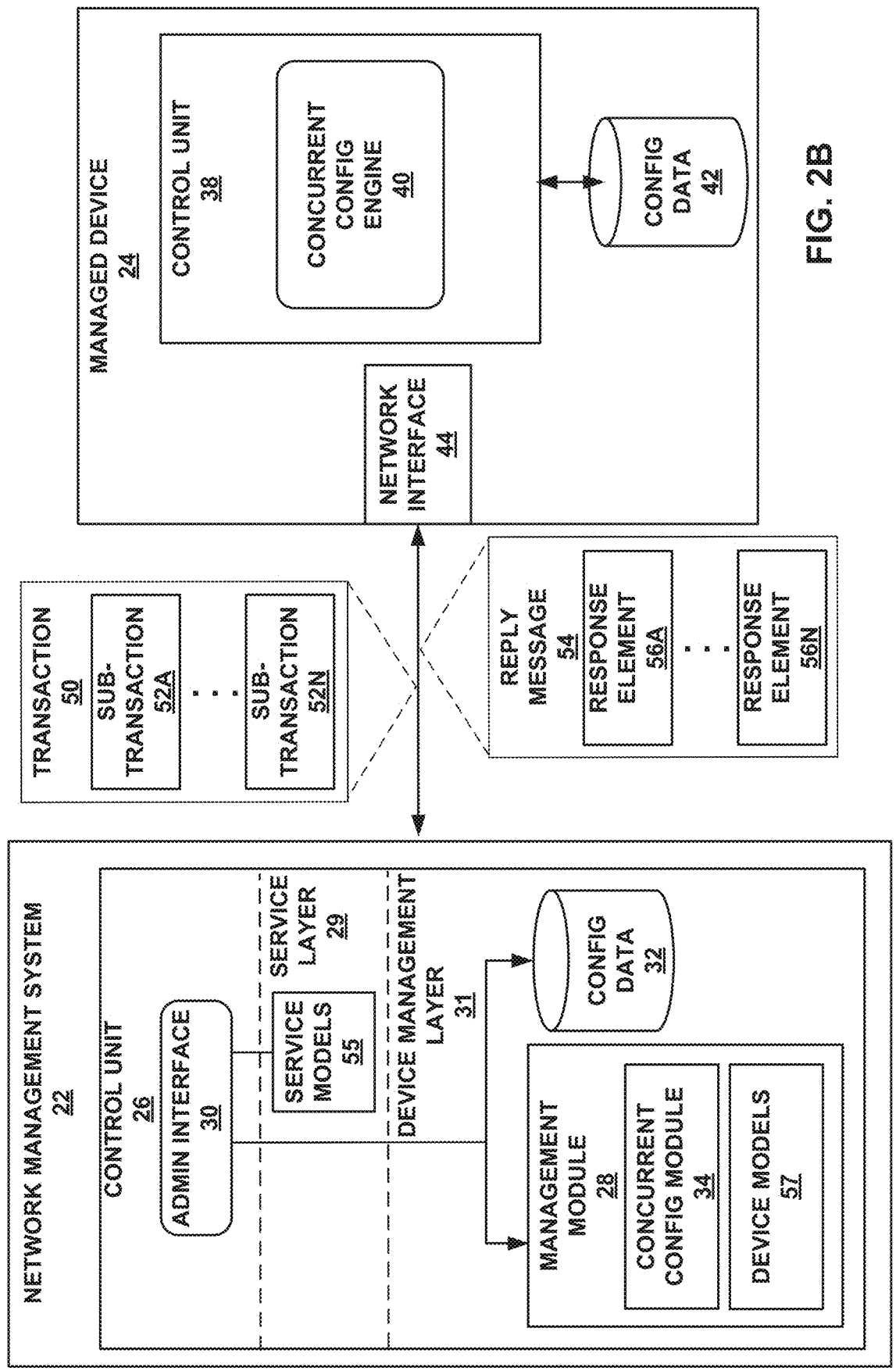
FIG. 2B is a block diagram illustrating an example network management device and an example managed device that concurrently commits multiple sub-transactions in accordance with one or more aspects of this disclosure.

FIG. 2B is a block diagram illustrating more generally an example network management system 22 and an example managed device 24 that concurrently commits multiple sub-transactions in accordance with one or more aspects of this disclosure. Network management system 22 manages managed device 24 using a management protocol, such as NETCONF, for exchanging management protocol messages over a communication link. Network management system 22 may also be referred to as network management devices in this disclosure. While described with respect to one particular protocol for managing network devices, e.g., NETCONF, techniques of this disclosure may apply to any network management protocol that provides mechanisms to install, manipulate, and delete the configuration of network devices.

Network management system 22 may be an example of a network management system 10 of FIG. 1 and managed device 24 may be an example of element 5A of FIG. 1. In the example illustrated in FIG. 2, network management system 22 includes control unit 26 and managed device 24 includes network interface 44 and control unit 38.

Each of control unit 26 and control unit 38 may include one or more processors that execute software instructions, such as those used to define a software or computer program, stored to a computer-readable storage medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 38 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 26 provides an operating environment for administrative interface (ADMIN INTERFACE) 30, service layer 29, and device management layer 31. Generally, service layer 29 may be responsible for generating the request in accordance with service models 55 and passing the request to management module 28 within device management layer 31. Further, device management layer 31 may be responsible for constructing a configuration change request in accordance with device models 57. As shown, service layer 29 includes service models 55. Device management layer 31 includes management module 28 and configuration data (CONFIG DATA) 32.

Service models 55 may include an application level model (e.g., Yet Another Next Generation model or simply "YANG model") that may be used to model configuration and state data manipulated by the NETCONF, NETCONF remote procedure calls, and NETCONF notifications. YANG is described in M. Bjorklund, Ed, RFC 6020: "YANG—A Data Modeling Language for the Network Configuration Protocol (NETCONF)," Network Working Group, the Internet Engineering Task Force draft, October 2010, available at http://tools.ietf.org/html/rfc6020, which is incorporated herein by reference in its entirety. For example, service models 55 may receive, via administrator interface 30, an application level configuration for managed device 24. In this example, the application level configuration may be in accordance with the YANG model. Service models 55 may translate the application level configuration from the YANG model into configuration changes for device models 57.

Management module 28 represents an exemplary instance of a management application (e.g., NETCONF) or, more generally, a network management application. Management module 28 is one example of a network management module. In one example, management module 28 provides mechanisms to install, manipulate, and delete the configuration of network devices of elements 5 of FIG. 1 and/or managed device 24. Device models 57 may include a low level or device level model (e.g., NETCONF") that may be used to model configuration change requests. Concurrent configuration module (CONCURRENT CONFIG ENGINE) 34 may be configured to implement one or more techniques described herein for concurrently committing multiple sub-transactions.

Managed device 24 may be any device having one or more processors and a memory, and that is capable of executing one or more software processes, including concurrent configuration engine 40, that operates in accordance with a network management protocol, such as NETCONF. Managed device 24 stores a running configuration for forwarding network packets in configuration data (CONFIG DATA) 42. Control unit 38 of device 24 provides an operating environment for concurrent configuration engine 40 and configuration data 42. Configuration data 42 may be stored in a data repository and may each store data in the form of one or more tables, databases, linked lists, radix trees, or other suitable data structure.

A network operator or other administrator interacts with administrative interface 30 to direct management module 28 to manage device 24 in a specified manner, e.g., to modify the configuration of device 24. For example, the administrate may enter commands to modify configuration data 32 and ultimately to deploy the configuration data to configuration data 42 as a running configuration of managed device 24.

In accordance with one or more techniques described herein, network management system 22 extends one or more of service models 55 to translate application level service requirements into a respective sub-transaction of configuration changes at managed device 24 in accordance with various aspects of the techniques described in this disclosure. In this way, the techniques provide certain technical advantage in which support and use of the low-level extensions to the device management protocol, e.g., NETCONF, can be easily controlled by and enabled for high-level network services.

Further, in accordance with one or more techniques described herein, concurrent configuration module 34 may generate a configuration change request in the form of a single message representative of an overall transaction 50 that includes sub-transactions 52A-52N (collectively, sub-transactions 52), where each sub-transaction specifies a corresponding set of configuration change(s), e.g., insertions, deletions and/or modifications, and where each set of configuration changes can be separately committed and validated by managed device 24 to the underlying configuration data 42 of the device even though contained in the same request. In some examples, concurrent configuration module 34 generates transaction 50 in accordance with device models 57 (e.g., NETCONF). In this example, each sub-transaction of sub-transactions 52 specifies multiple respective configuration changes for managed device 24, while in some examples, one or more sub-transactions of sub-transactions 52 may specify a single respective configuration change for managed device 24. As shown, concurrent configuration module 34 outputs the request to managed device 24.

Network interface 44 receives the request indicating transaction 50 including sub-transactions 52. Concurrent configuration engine 40 selectively installs, for each sub-transaction of sub-transactions 52, respective configuration changes at configuration data 42 of managed device 24. For example, concurrent configuration engine 40 applies configuration changes for sub-transactions 52A and determines whether the configuration changes for sub-transactions 52A are committed in a running configuration stored at configuration data 42. In this example, concurrent configuration engine 40 may "roll-back" configuration changes when the configuration changes are not each committed in the running configuration (e.g., a particular configuration change is not supported by managed device 24). In this way, concurrent configuration engine 40 may help to ensure that either each configuration change of a sub-transaction is committed at the running configuration or that none of the configuration changes of a sub-transaction are committed at the running configuration.

Concurrent configuration engine 40 constructs reply message 54 based on the selectively installing. In this example, reply message 54 includes, for each sub-transaction of sub-transactions 52, a corresponding response element of response elements 56A-56N (collectively, response elements 56) indicating whether managed device 24 committed the respective configuration changes in a running configuration for managed device 24. For example, concurrent configuration engine 40 generates response element 56A as a negative response in response to determining managed device 24 does not commit configuration changes for sub-transaction 52A. In some examples, concurrent configuration engine 40 generates response element 56N as a positive response in response to determining managed device 24 commits configuration changes for sub-transaction 52N. As shown, network interface 44 outputs the reply to network management system 22.

Concurrent configuration module 34 updates configuration data 32 based on reply message 54. For example, in response to receiving reply message 54 including response element 56A specifying configuration changes for sub-transaction 52A are not successfully committed at managed device 24, concurrent configuration module 34 refrains from updating configuration data 32 to include the configuration changes for sub-transaction 52A. In response to receiving reply message 54 including response element 56N specifying configuration changes for sub-transaction 52N are successfully committed at managed device 24, concurrent configuration module 34 updates configuration data 32 to include the configuration changes for sub-transaction 52N.

Figure 3:
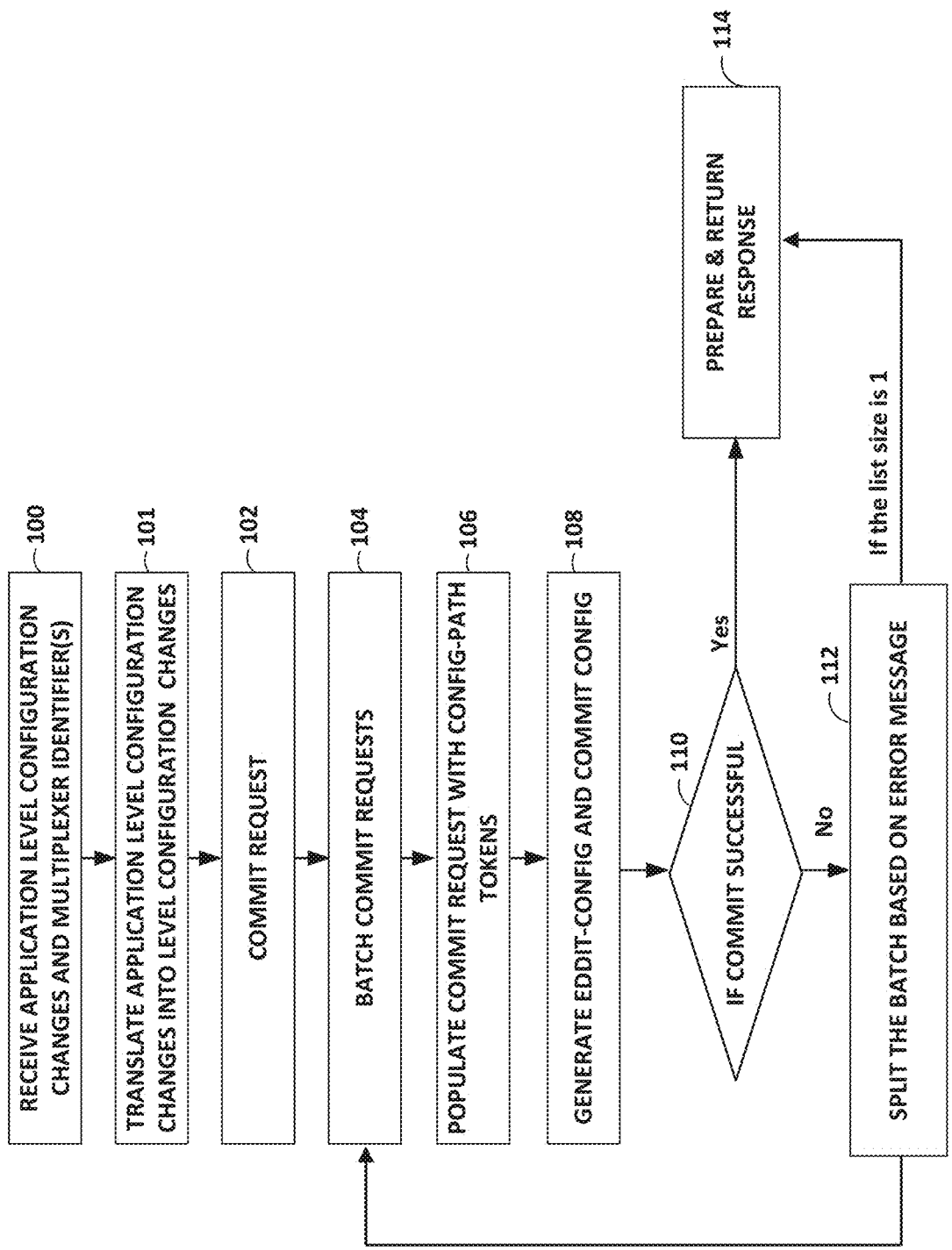
FIG. 3 is a flowchart illustrating an example operation of a network management system that splits sub-transactions of a configuration change request in accordance with the techniques of the disclosure.

FIG. 3 is a flowchart illustrating an example operation of a network management system that splits sub-transactions of a configuration change request in accordance with the techniques of the disclosure. FIG. 3 is described with respect to network management system 22 of FIG. 2B for exemplary purposes only. In the example of FIG. 3, a network management system divides a batch of configuration change requests when a network device does not support sub-transaction identifiers.

Initially, administrator interface 30 receives application level configuration changes and one or more multiplexer identifiers (100). For example, administrator interface 30 receives the application level configuration changes and multiplexer identifiers from administrator 12. Service layer 29 translates the application level configuration changes into low level configuration changes (101). For example, service layer 29 translates, using the YANG model of service models 55, an application level configuration change of the application level configuration corresponding to a multiplexer identifier (e.g., hub name, hub name and tenant identifier, etc.) into a configuration change of a low level configuration of device models 57 (e.g., NETCONF). However, in the example of FIG. 3, the network device does not support sub-transaction identifiers. As such, the configuration change of a low level configuration of device models 57 in the example of FIG. 3 does not include a sub-transaction identifier.

Device management layer 31 receives a commit request from service layer 29, where service layer 29 has generated the commit request according to service models 55 (e.g., according to the multiplexer extension of the YANG model) and has pushed the commit request down to device management layer 31 (commit request) (102). Concurrent configuration module 34 internally batches the configuration changes from the service layer (104).

Concurrent configuration module 34 may be configured to generate device level configuration change requests in accordance with device models 57 (e.g., NETCONF). For example, concurrent configuration module 34 may concurrently send "multiple sub-transactions" as part of a transaction (e.g., edit-config) without using a sub-transaction identifier. Concurrent configuration module 34 populates configuration change requests with config-path tokens (106). For example, in one example, concurrent configuration module 34 include 3 tokens in the config paths that are part of configuration. Concurrent configuration module 34 generates a configuration change request (edit-config and commit config) (108). For example, concurrent configuration module 34 generates, in accordance with a device management protocol (e.g., NETCONF), a configuration change request representing a transaction specifying a batch of configuration changes for a network device. In this example, concurrent configuration module 34 may output the configuration change request and receive a reply message.

Concurrent configuration module 34 determines whether the commit is successful (110). If all response elements of a reply message are positive ("Yes" of 110), concurrent configuration module 34 prepares and returns a response (114). For example, concurrent configuration module 34 outputs a return success to a caller (e.g., administrator 12).

Again, in some examples, all network devices may not support sub-transaction identifiers. In those cases, a "device management" layer in network management system 22 may handle concurrent transactions. For example, concurrent configuration module 34 may batch configuration changes and commit the batched configuration changes all together. Accordingly, in response to receiving a negative response element ("No" of 110), concurrent configuration module 34 may split the batch of sub-transactions based on an error message (112) and go to step 104. For example, in response to receiving a reply message specifying the batch of configuration change are not successfully committed at the network device, concurrent configuration module 34 may divide the batch of configuration changes into a first sub-set of one or more configuration changes and a second sub-set of one or more configuration changes based on an error message indicated in the reply message.

While dividing the batch, concurrent configuration module 34 may use the "config-path token" present in commit-request. "Config-path token" may be the first 3 tokens in the configuration paths that are part of a configuration. Concurrent configuration module 34 may check the "error path config" and use the config-path token while splitting commit-requests. All the configurations whose configuration token matches the error response path may be part of a first group and all other configurations would be part of one or more other groups (e.g., a second group). While grouping the configs, concurrent configuration module 34 may also consider leaf-referred attributes (also referred to simply as "leafrefs").

Example pseudocode showing an example algorithm for implementing the above-described functionality is as follows:

```
Function deploy(commit-requests)
    For every commit-request
        Parse the first few tokens(Config-paths) in config-change
and update commit-request
        call Batch-commit(commit-requests)
```

Figure 4:
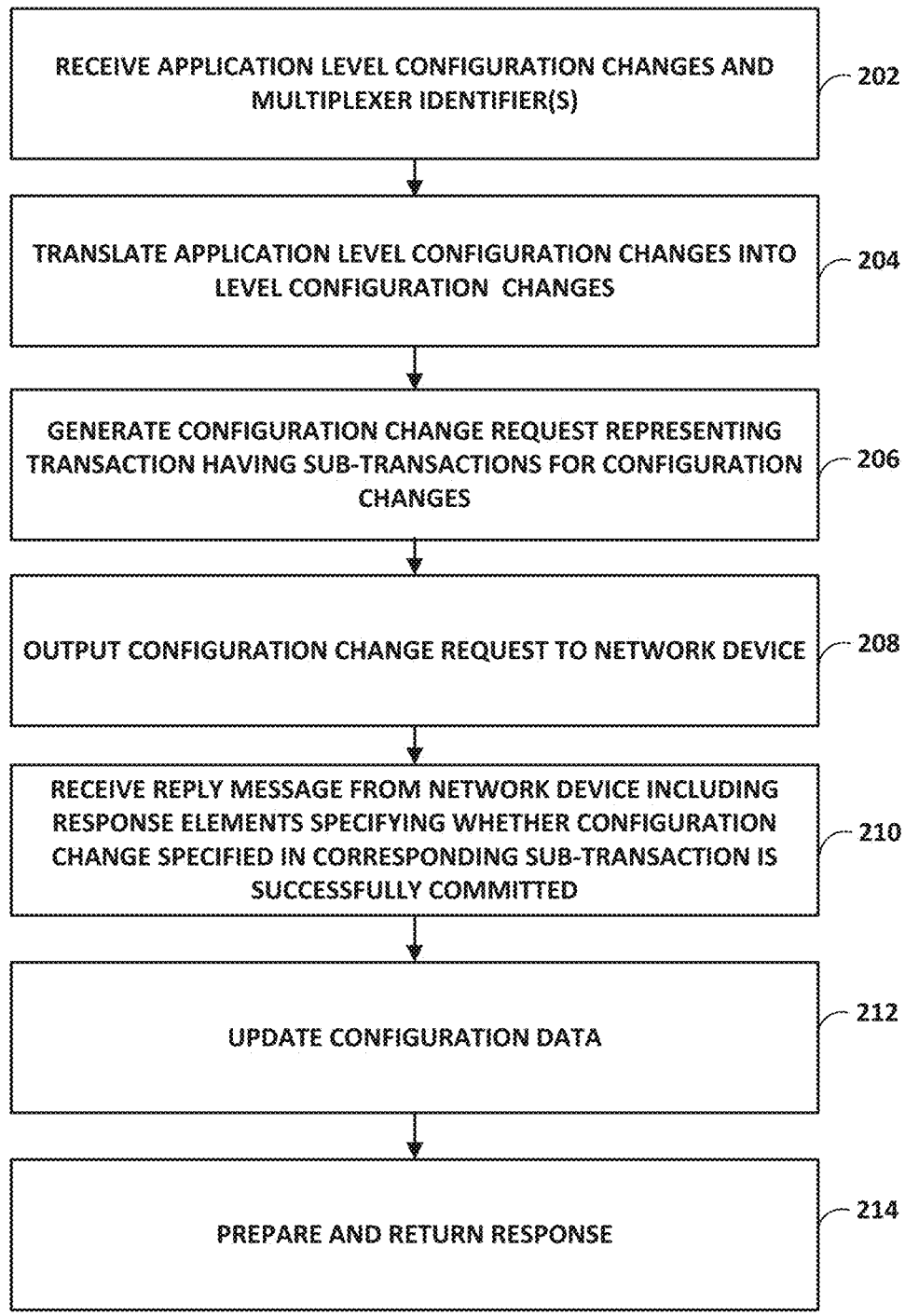
FIG. 4 is a flowchart illustrating an example operation of a network management system in accordance with the techniques of the disclosure.

FIG. 4 is a flowchart illustrating an example operation of a network management system in accordance with the techniques of the disclosure. FIG. 4 is described with respect to network management system 22 of FIG. 2B for exemplary purposes only. In the example of FIG. 4, a network device supports sub-transaction identifiers.

Initially, administrator interface 30 receives application level configuration changes and one or more multiplexer identifiers (202). For example, administrator interface 30 receives the application level configuration changes and multiplexer identifiers from administrator 12.

Service layer 29 translates the application level configuration changes into low level configuration changes (204). For example, service layer 29 translates, using the YANG model of service models 55, a first application level configuration change of the application level configuration corresponding to a first multiplexer identifier (e.g., hub name, hub name and tenant identifier, etc.) into a first configuration change of a low level configuration of device models 57 (e.g., NETCONF) corresponding to a first sub-transaction identifier. In this example, service layer 29 may translate, using the YANG model of service models 55, a second application level configuration change of the application level configuration corresponding to a second multiplexer identifier (e.g., hub name, hub name and tenant identifier, etc.) into the second configuration change of the low level configuration of device models 57 (e.g., NETCONF) corresponding to a second sub-transaction identifier.

Concurrent configuration module 34 generates a configuration change request representing a transaction having sub-transactions for configuration changes (206). For example, concurrent configuration module 34 generates the configuration change request representing transaction 50 having a first sub-transaction 52A that indicates a first sub-transaction identifier and a second sub-transaction 52B that indicates a second sub-transaction identifier.

In some examples, a network device may (as part of discovery) publish (e.g., to concurrent configuration module 34) support for a transaction including multiple sub-transactions by the following string urn:ietf:params:NETCONF: capability: concurrent-transactions:1.0. In this example, concurrent configuration module 34 may generate, for the network device, the configuration change request representing transaction 50 having a first sub-transaction 52A that indicates a first sub-transaction identifier and a second sub-transaction 52B that indicates a second sub-transaction identifier in response to receiving the string urn:ietf:params: NETCONF:capability: concurrent-transactions:1.0 from the network device.

In some examples, the concurrent-transactions capability modifies <edit-config> operation to accept the sub-transaction identifier in a configuration node that defines the transaction scope of the change. In some examples, there can be 1 or more configuration nodes that define hierarchy of the configuration as defined by the device data model.

An example configuration change request is as follows.

```
<rpc message-id="101"
    xmlns="urn:ietf:params:xml:ns:NETCONF:base:1.0">
  <edit-config>
    <target>
      <running/>
    </target>
    <config sub-transactionid="a1234">
      <top xmlns="http://example.com/schema/1.2/config">
        <interface>
          <name>Ethernet0/0</name>
          <mtu>1500</mtu>
        </interface>
      </top>
    </config>
    <config sub-transactionid="a1235">
      <top xmlns="http://example.com/schema/1.2/config">
        <interface>
          <name>Ethernet10/0</name>
          <mode>trunk</mode>
        </interface>
      </top>
    </config>
  </edit-config>
</rpc>
```

Concurrent configuration module 34 outputs the configuration change request to a network device (208). For example, concurrent configuration module 34 outputs the configuration change request representing transaction 50 to managed device 24.

Concurrent configuration module 34 receives a reply message from the network device including one or more response elements specifying whether a configuration change specified in a corresponding sub-transaction is successfully committed (210). For example, concurrent configuration module 34 receives reply message 54 from managed device 24 including response elements 56. For example, concurrent configuration module 34 receives a reply message including a respective positive response element that an contains an <ok> element along with a respective sub-transactionid when a network device is able to satisfy the configuration changes of the respective sub-transaction. Similarly, concurrent configuration module 34 receives a reply message including a respective negative response element that an contains an <rpc-error> element along with a respective sub-transactionid when a network device is not able to satisfy the configuration changes of the respective sub-transaction. An example reply message is as follows.

```
<rpc-reply message-id="101"
    xmlns="urn:ieft:params:xml:ns:NETCONF:base:1.0">
  <ok sub-transactionid="a1234"/>
  <ok sub-transactionid="a1235"/>
  <ok sub-transactionid="a1236"/>
  <rpc-error sub-transactionid="a1237">
    <error-type>sub-transaction failed </error-type>
    <error-tag>vlan-id is undefined </error-tag>
    <error-severity>error</error-severity>
    <error-message>
      vlan-id is undefined
    </error-message>
  </rpc-error>
</rpc-reply>
```

Concurrent configuration module 34 updates configuration data and devices the configuration changes (212). For example, concurrent configuration module 34 may update configuration data 32 to include the one or more configuration changes corresponding to one or more positive response elements of the reply message. Concurrent configuration module 34 prepares and returns a response (214). For example, concurrent configuration module 34 outputs a return success to a caller (e.g., administrator 12).

Figure 5:
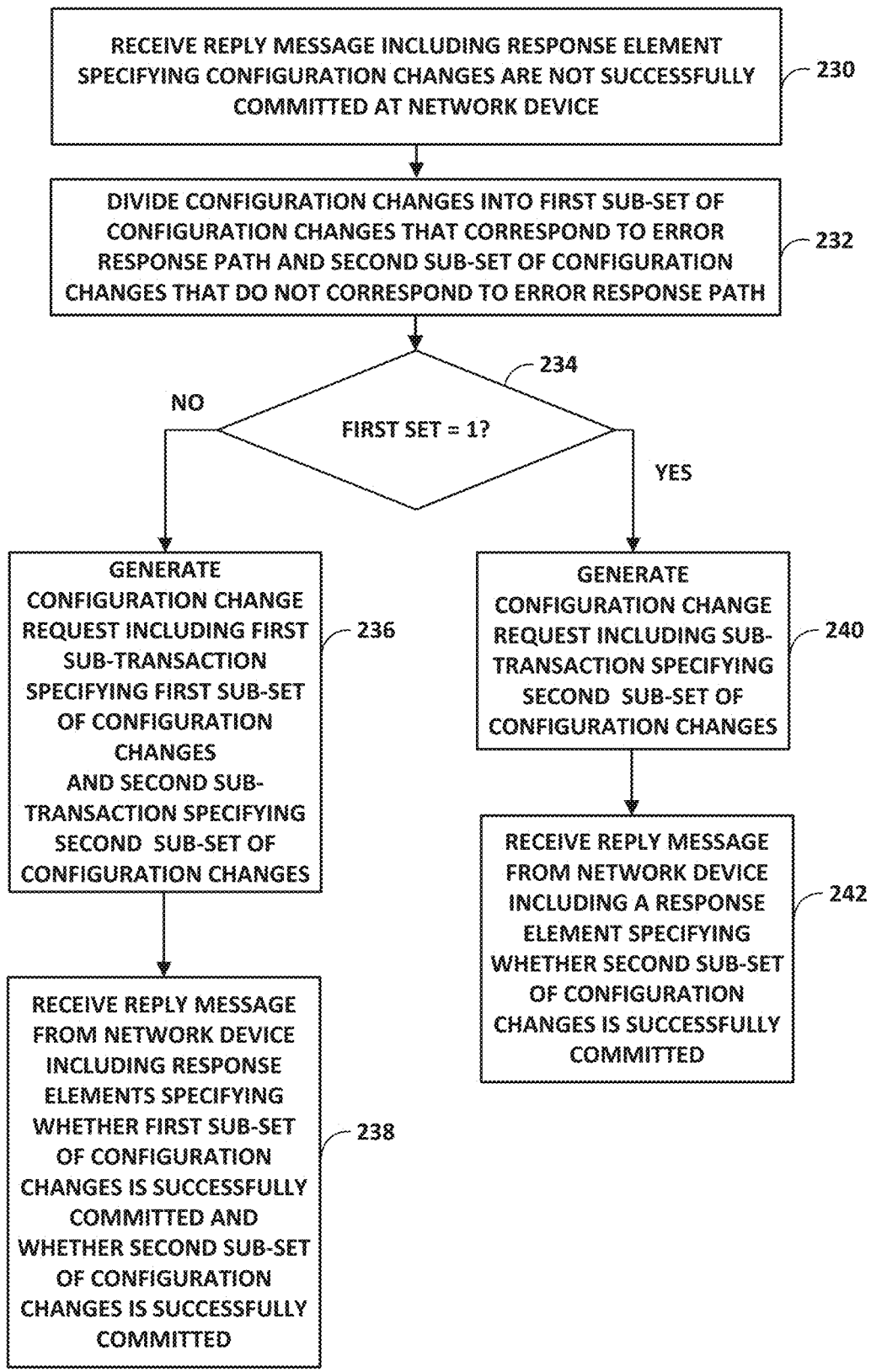
FIG. 5 is a flowchart illustrating an example operation of a network management system that divides sub-transactions of a configuration change request in accordance with the techniques of the disclosure.

FIG. 5 is a flowchart illustrating an example operation of a network management system that divides sub-transactions of a configuration change request in accordance with the techniques of the disclosure. FIG. 5 is described with respect to network management system 22 of FIG. 2B for exemplary purposes only. In the example of FIG. 5, a network management system divides a batch of configuration change requests when a network device does not support sub-transaction identifiers.

Initially, concurrent configuration module 34 may receive a reply message including a response element specifying configuration changes are not successfully committed at a network device (230). Concurrent configuration module 34 divides the configuration changes into a first sub-set of configuration changes that correspond to an error response path and a second sub-set of configuration changes that do not correspond to the error response path (232).

In response to determining that the first sub-set includes only a single configuration change ("YES" of 234), concurrent configuration module 34 generates a configuration change request including a sub-transaction specifying the second sub-set of configuration changes (240). Concurrent configuration module 34 receives a reply message from a network device including a response element specifying whether the second sub-set of configuration changes is successfully committed (242).

In response, however, to determining that the first sub-set does not include only 1 configuration change ("NO" of 234), concurrent configuration module 34 generates a configuration change request including a first sub-transaction specifying the first sub-set of configuration changes and a second sub-transaction specifying the second sub-set of configuration changes (236). Concurrent configuration module 34 receives a reply message from a network device including a first response element specifying whether the first sub-set of configuration changes is successfully committed and a second response element specifying whether the second sub-set of configuration changes is successfully committed (238).

Figure 6:
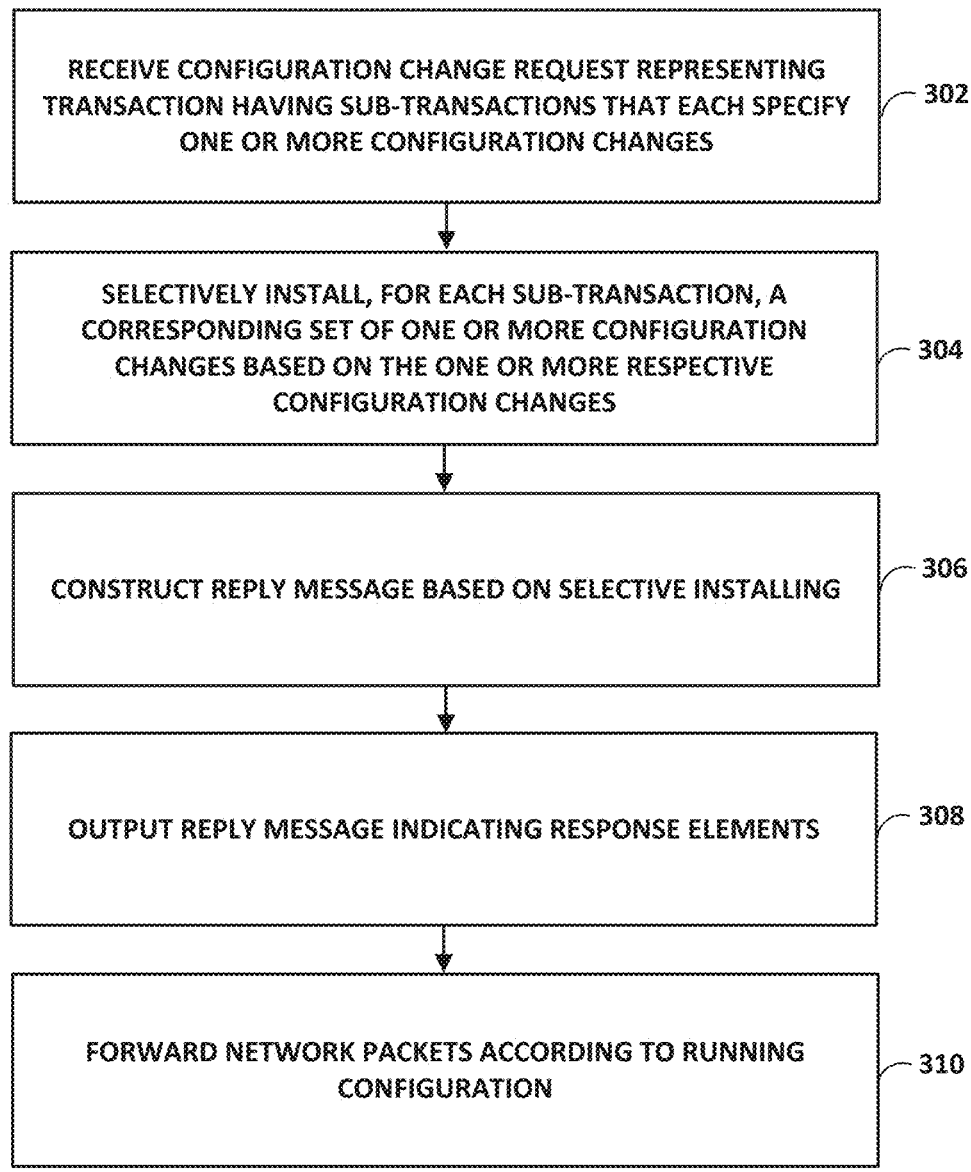
FIG. 6 is a flowchart illustrating an example operation of a managed network device in accordance with the techniques of the disclosure.

FIG. 6 is a flowchart illustrating an example operation of a managed network device in accordance with the techniques of the disclosure. FIG. 6 is described with respect to managed device 24 of FIG. 2B for exemplary purposes only. Initially, concurrent configuration engine 40 receives a configuration change request representing a transaction having a plurality of sub-transactions that each specify one or more configuration changes (302).

Concurrent configuration engine 40 selectively installs, for each sub-transaction of the plurality of sub-transactions, a corresponding set of one or more configuration changes based on the one or more respective configuration changes (304). For example, concurrent configuration engine 40 attempts to commit, for each sub-transaction of the plurality of sub-transactions, a corresponding set of one or more configuration changes to the running configuration stored at configuration data 42.

Concurrent configuration engine 40 constructs a reply message based on the selective installing (306). For example, concurrent configuration engine 40 generates the reply message to include a negative response element for each sub-transaction having at least one configuration change that is not successfully committed and to include a positive response element for each sub-transaction having no configuration changes that are not successfully committed. In some examples, concurrent configuration engine 40 generates the reply message to include a negative response element and a respective sub-transaction identifier for each sub-transaction having at least one configuration change that is not successfully committed and to include a positive response element and a respective sub-transaction identifier for each sub-transaction having no configuration changes that are not successfully committed.

Concurrent configuration engine 40 outputs a reply message indicating the response elements (308). For example, concurrent configuration engine 40 outputs the reply message indicating the response elements to network management system 22. Concurrent configuration engine 40 forwards network packets according to the running configuration (310). For example, concurrent configuration engine 40 forwards network packets according to the running configuration stored at configuration data 42.

Figure 7:
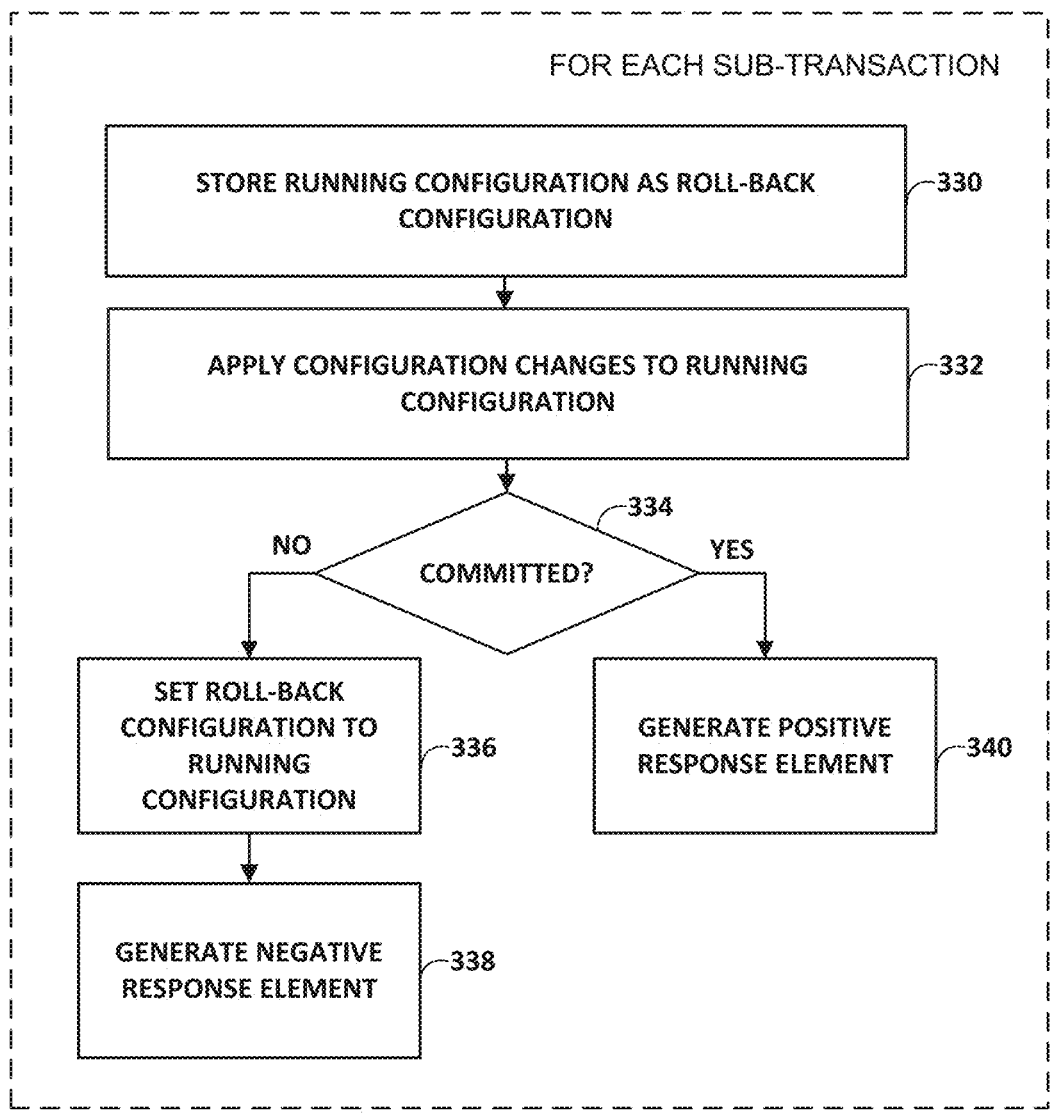
FIG. 7 is a flowchart illustrating an example operation of a managed network device that selectively installs sub-transactions in accordance with the techniques of the disclosure.

FIG. 7 is a flowchart illustrating an example operation of a managed network device that selectively installs sub-transactions in accordance with the techniques of the disclosure. FIG. 7 is described with respect to managed device 24 of FIG. 2B for exemplary purposes only. Initially, concurrent configuration engine 40 stores, for each sub-transaction of a plurality of sub-transactions included in a configuration change request, a running configuration as a roll-back configuration (330). For example, concurrent configuration engine 40 stores "snapshot" of a running configuration stored at configuration data 42.

Concurrent configuration engine 40 applies, for each sub-transaction of the plurality of sub-transactions, one or more configuration changes to a running configuration (332). For example, concurrent configuration engine 40 applies, for each sub-transaction of the plurality of sub-transactions, one or more configuration changes to a running configuration at configuration data 42. Concurrent configuration engine 40 determines whether each sub-transaction has been committed (334). For example, concurrent configuration engine 40 validates whether a group of configuration changes for a sub-transaction are successfully committed at configuration data 42.

In response to determining that the one or more configuration changes are not committed ("NO" of step 334), concurrent configuration engine 40 sets the roll-back configuration to the running configuration as (336). For example, concurrent configuration engine 40 sets the roll-back configuration stored at configuration data 42 to the running configuration and generates a negative response element (338). In response, however, to determining that the one or more configuration changes are committed ("YES" of step 334), concurrent configuration engine 40 generates a positive response element (340).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A method performed by a network management system (NMS) device that manages a network, the method comprising:

generating, by processing circuitry of the NMS device, in accordance with a device management protocol, a configuration change request representing a transaction having a first sub-transaction specifying a first configuration change for a network device of the network and a second sub-transaction specifying a second configuration change for the same network device, wherein the configuration change request indicates a transaction identifier for the transaction, indicates a first sub-transaction identifier for the first configuration change, and indicates a second sub-transaction identifier for the second configuration change;

outputting, by the processing circuitry, the configuration change request to the network device that represents the transaction having the first sub-transaction specifying the first configuration change for the network device of the network and the second sub-transaction specifying the second configuration change for the same network device;

receiving, by the processing circuitry, a reply message from the network device indicating the transaction identifier output in the configuration change request, the reply message including a first response element specifying that the first configuration change is successfully committed at the network device and indicating the first sub-transaction identifier output in the configuration change request and a second response element specifying that the second configuration change is not successfully committed at the network device and indicating the second sub-transaction identifier output in the configuration change request;

in response to receiving the reply message including the first response element specifying the first configuration change is successfully committed at the network device and indicating the first sub-transaction identifier output in the configuration change request, updating, by the processing circuitry, configuration data for the network to include the first configuration change; and in response to receiving the reply message including the second response element specifying the second configuration change is not successfully committed at the network device and indicating the second sub-transaction identifier output in the configuration change request, refraining from updating, by the processing circuitry, the configuration data for the network to include the second configuration change.

2. The method of claim 1, wherein the device management protocol is a first device management protocol, the method comprising:
receiving, by the processing circuitry, via an administrator interface, an application level configuration for the network in accordance with a second device management protocol; and
translating, by the processing circuitry, in accordance with a second device management protocol, the application level configuration into the first configuration change and the second configuration change.

3. The method of claim 2,
wherein the first device management protocol comprises a Network Configuration (NETCONF) protocol; and
wherein the second device management protocol comprises a YANG model and wherein translating the application level configuration comprises translating, using the YANG model, a first application level configuration change of the application level configuration corresponding to a first multiplexer identifier into the first configuration change and translating, using the YANG model, a second application level configuration change of the application level configuration corresponding to a second multiplexer identifier into the second configuration change.

4. The method of claim 3,
wherein the network device is a hub network device connected to a plurality of network devices of the network;
wherein the first multiplexer identifier comprises a hub name for the hub network device and a first identifier value; and
wherein the second multiplexer identifier comprises the hub name and a second identifier value.

5. The method of claim 3,
wherein the network device is a hub network device connected to one or more network devices for a first tenant and one or more network devices for a second tenant;
wherein the first multiplexer identifier comprises a hub name for the hub network device and a first tenant identifier for the first tenant; and
wherein the second multiplexer identifier comprises the hub name and a second tenant identifier for the second tenant.

6. The method of claim 1, wherein the configuration change request is a first configuration change request, wherein the transaction is a first transaction, wherein the reply message is a first reply message, wherein the network device is a first network device, the method comprising:
generating, by the processing circuitry, in accordance with the device management protocol, a second configuration change request representing a second transaction specifying a batch of configuration changes for a second network device of the network;
outputting, by the processing circuitry, the second configuration change request to the second network device; and
in response to receiving a second reply message specifying the batch of configuration change are not successfully committed at the network device, dividing, by the processing circuitry, the batch of configuration changes into a first sub-set of one or more configuration changes and a second sub-set of one or more configuration changes.

7. The method of claim 6, wherein dividing the batch of configuration changes is based on an error message indicated in the second reply message.

8. The method of claim 6, comprising:
generating, by the processing circuitry, in accordance with the device management protocol, a third configuration change request indicating a third transaction specifying the first sub-set of one or more configuration changes for the second network device; and
outputting, by the processing circuitry, the third configuration change request to the second network device.

9. A network management system (NMS) device comprising:
a control unit;
a configuration datastore configured to store configuration data; and
a device configuration manager executing on the control unit of the NMS device to:
generate, in accordance with a device management protocol, a configuration change request representing a transaction having a first sub-transaction specifying a first configuration change for a network device of the network and a second sub-transaction specifying a second configuration change for the same network device, wherein the configuration change request indicates a transaction identifier for the transaction, indicates a first sub-transaction identifier for the first configuration change, and indicates a second sub-transaction identifier for the second configuration change;

output the configuration change request to the network device that represents the transaction having the first sub-transaction specifying the first configuration change for the network device of the network and the second sub-transaction specifying the second configuration change for the same network device;

receive a reply message from the network device indicating the transaction identifier output in the configuration change request, the reply message including a first response element specifying that the first configuration change is successfully committed at the network device and indicating the first sub-transaction identifier output in the configuration change request and a second response element specifying that the second configuration change is not successfully committed at the network device and indicating the second sub-transaction identifier output in the configuration change request;

in response to receiving the reply message including the first response element specifying the first configuration change is successfully committed at the network device, update configuration data for the network to include the first configuration change; and in response to receiving the reply message including the second response element specifying the second configuration change is not successfully committed at the network device, refrain from updating the configuration data for the network to include the second configuration change.

10. The NMS device of claim 9, wherein the device management protocol is a first device management protocol and wherein the device configuration manager is further configured to:

receive, via an administrator interface, an application level configuration for the network in accordance with a second device management protocol; and translate, in accordance with a second device management protocol, the application level configuration into the first configuration change and the second configuration change.

11. The NMS device of claim 10, wherein the first device management protocol comprises a Network Configuration (NETCONF) protocol; and wherein the second device management protocol comprises a YANG model and wherein, to translate the application level configuration, the device configuration manager is configured to translate, using the YANG model, a first application level configuration change of the application level configuration corresponding to a first multiplexer identifier into the first configuration change and translate, using the YANG model, a second application level configuration change of the application level configuration corresponding to a second multiplexer identifier into the second configuration change.

12. The NMS device of claim 11, wherein the network device is a hub network device connected to a plurality of network devices of the network;

wherein the first multiplexer identifier comprises a hub name for the hub network device and a first identifier value; and wherein the second multiplexer identifier comprises the hub name and a second identifier value.

13. The NMS device of claim 11, wherein the network device is a hub network device connected to one or more network devices for a first tenant and one or more network devices for a second tenant;

wherein the first multiplexer identifier comprises a hub name for the hub network device and a first tenant identifier for the first tenant; and wherein the second multiplexer identifier comprises the hub name and a second tenant identifier for the second tenant.

14. The NMS device of claim 9, wherein the configuration change request is a first configuration change request, wherein the transaction is a first transaction, wherein the reply message is a first reply message, wherein the network device is a first network device, wherein the device configuration manager is further configured to:

generate, in accordance with the device management protocol, a second configuration change request representing a second transaction specifying a batch of configuration changes for a second network device of the network;

output the second configuration change request to the second network device; and in response to receiving a second reply message specifying the batch of configuration change are not successfully committed at the network device, divide the batch of configuration changes into a first sub-set of one or more configuration changes and a second sub-set of one or more configuration changes.

15. The NMS device of claim 14, wherein dividing the batch of configuration changes is based on an error message indicated in the second reply message.

16. The NMS device of claim 14, wherein the device configuration manager is further configured to:

generate, in accordance with the device management protocol, a third configuration change request indicating a third transaction specifying the first sub-set of one or more configuration changes for the second network device; and output the third configuration change request to the second network device.

17. A method performed by a managed device of a network, the method comprising:

receiving, by processing circuitry of the managed device, from a network management system, a configuration change request representing a transaction having a plurality of sub-transactions, wherein each sub-transaction of the plurality of sub-transactions specifies one or more respective configuration changes for the managed device, wherein the configuration change request indicates a transaction identifier for the transaction and wherein the configuration change request indicates a respective sub-transaction identifier for each configuration change of the plurality of sub-transactions;

selectively installing, by the processing circuitry, for each sub-transaction of the plurality of sub-transactions, the one or more respective configuration changes at the managed device;

constructing, by the processing circuitry, a reply message based on the selectively installing, wherein the reply message indicates the transaction identifier indicated in the configuration change request and comprises, for each sub-transaction of the plurality of sub-transactions, a respective response element indicating whether the managed device committed the one or more respective configuration changes in a running configuration for the managed device and indicating the respective sub-transaction identifier indicated in the configuration change request, wherein the reply message comprises, for a first sub-transaction of the plurality of sub-transactions, the respective response element indicating that the one or more respective configurations are successfully committed at the managed device and, for a second sub-transaction of the plurality of sub-transactions, the respective response element indicating that the one or more respective configurations are not successfully committed at the managed device;

outputting, by the processing circuitry, to the network management system, the reply message, wherein the network management system is configured to, in response to receiving the reply message including the first response element specifying the first configuration change is successfully committed at the network device, update configuration data for the network to include the first configuration change and, in response to receiving the reply message including the second response element specifying the second configuration change is not successfully committed at the network device, refrain from updating the configuration data for the network to include the second configuration change.

18. The method of claim 17, wherein selectively installing comprises applying one or more configuration changes specified by a particular sub-transaction of the plurality of sub-transactions to the running configuration; and wherein constructing the reply message comprises generating a positive response element for the particular sub-transaction in response to determining the managed device committed the one or more configuration changes in the running configuration.

* * * * *